(12) United States Patent
Huang et al.

(10) Patent No.: US 10,574,051 B2
(45) Date of Patent: Feb. 25, 2020

(54) ELECTRONIC APPARATUS AND OVERVOLTAGE PROTECTION STRUCTURE THEREOF

(71) Applicant: ZyXEL Communications Corp., New Taipei (TW)

(72) Inventors: Chung-Hsien Huang, Hsinchu (TW); Chih-Chien Tseng, Hsinchu (TW)

(73) Assignee: ZyXEL Communications Corp., New Taipei (TW)

( * ) Notice: Subject to any disclaimer, the term of this patent is extended or adjusted under 35 U.S.C. 154(b) by 296 days.

(21) Appl. No.: 15/684,956

(22) Filed: Aug. 24, 2017

(65) Prior Publication Data

US 2018/0278051 A1 Sep. 27, 2018

Related U.S. Application Data

(60) Provisional application No. 62/475,229, filed on Mar. 23, 2017.

(51) Int. Cl.
*H02H 9/04* (2006.01)
*H02H 3/20* (2006.01)
(Continued)

(52) U.S. Cl.
CPC .............. *H02H 9/042* (2013.01); *H01T 1/00* (2013.01); *H01T 1/22* (2013.01); *H01T 1/24* (2013.01);
(Continued)

(58) Field of Classification Search
CPC ........ H02H 9/041; H02H 9/042; H02H 9/043; H02H 9/044; H02H 9/045; H02H 9/046;
(Continued)

(56) References Cited

U.S. PATENT DOCUMENTS

| 6,529,361 B1 * | 3/2003 | Petschel | H01J 17/04 361/120 |
| 2012/0039010 A1 * | 2/2012 | Tresness | H01T 4/08 361/112 |

(Continued)

FOREIGN PATENT DOCUMENTS

| CN | 2651997 | 10/2004 |
| CN | 201075575 | 6/2008 |

OTHER PUBLICATIONS

"Office Action of Taiwan Counterpart Application", dated May 17, 2018, p. 1-p. 6.

*Primary Examiner* — Zeev V Kitov
(74) *Attorney, Agent, or Firm* — JCIPRNET

(57) ABSTRACT

An electronic apparatus and an overvoltage protection structure thereof are provided. The overvoltage protection structure includes a first signal transmission end and a second signal transmission end. The first signal transmission end has at least one first side, and couples to a protected component through a conductive wire. The second signal transmission end has at least one second side, wherein the at least one second side corresponds to the at least one first side and is adjacent to the at least one first side. Therein, there is at least one gap between the at least one second side and the at least one first side, and the gap is positively related to a threshold voltage of the overvoltage protection structure.

9 Claims, 5 Drawing Sheets

(51) Int. Cl.
*H01T 1/24* (2006.01)
*H01T 1/00* (2006.01)
*H01T 1/22* (2006.01)
*H01T 4/08* (2006.01)
*H01T 4/10* (2006.01)

(52) U.S. Cl.
CPC .............. *H01T 4/08* (2013.01); *H01T 4/10* (2013.01); *H02H 3/20* (2013.01); *H02H 9/041* (2013.01); *H02H 9/043* (2013.01); *H02H 9/044* (2013.01); *H02H 9/045* (2013.01); *H02H 9/046* (2013.01)

(58) Field of Classification Search
CPC .... H01T 1/00; H01T 1/22; H01T 1/24; H01T 4/08; H01T 4/10
USPC ........................................................ 361/91.1
See application file for complete search history.

(56) References Cited

U.S. PATENT DOCUMENTS

2013/0128401 A1* 5/2013 Tsaur ..................... H01T 4/00
                                                     361/56
2015/0015243 A1   1/2015 Moosburger et al.
2017/0358903 A1* 12/2017 Benz ..................... H01T 13/39

* cited by examiner ated patent application is hereby incorporated by reference herein and made a part of this specification.

ELECTRONIC APPARATUS AND OVERVOLTAGE PROTECTION STRUCTURE THEREOF

CROSS-REFERENCE TO RELATED APPLICATION

This application claims the priority benefit of U.S. provisional application Ser. No. 62/475,229, filed on Mar. 23, 2017. The entirety of the above-mentioned patent application is hereby incorporated by reference herein and made a part of this specification.

BACKGROUND OF THE INVENTION

Field of the Invention

The invention relates to an electronic apparatus and an overvoltage protection structure thereof, and more particularly relates to an overvoltage protection structure disposed on a circuit board and an electronic apparatus.

Description of Related Art

When an Electrical Over Stress (EOS) or an Electrostatic Discharge (ESD) phenomenon occurs, it often causes damages to the circuit components in the electronic apparatus. Conventionally, a so-called Transient-Voltage-Suppression (TVS) diode is often observed in the electronic apparatus as a protection mechanism for EOS and ESD phenomenon. The TVS diode is configured to connect a component being protected and acts as a voltage clamping device. When a voltage applied to the component being protected is greater than the maximum voltage tolerance boundary, the TVS diode would correspondingly operates by shunting excessive current to the ground, so as to prevent the circuit component from being damaged. However, the TVS diode used in conventional technology often has a higher parasitic capacitance value, and the occupied area of TVS diodes thereof is positively related to its avalanche breakdown capability, in other words, the better protection it has the larger area it occupied. In addition, when managing the EOS/ESD events, an overvoltage protection action performed by the conventional TVS diode only protects specific circuit components at a particular region in the circuit. More specifically, it is necessary to adjust a position of the TVS diodes according to a layout position of the component being protected in order to effectively exert the overvoltage protection effect. Furthermore, capability of the overvoltage protection of a single TVS component is limited. While providing the overvoltage protection action for a larger energy, a plurality of TVS components are required in order to achieve the outcome, resulting in a waste of excessive circuit area. Therefore, adopting TVS diodes for overvoltage protection often results in an increase of cost and size of the electronic apparatus, decreasing product competitiveness.

SUMMARY OF THE INVENTION

The invention provides an overvoltage protection structure to achieve an overvoltage protection for a protected component through simple structural design.

An overvoltage protection structure of the invention includes a first signal transmission end and a second signal transmission end. The first signal transmission end has at least one first side and couples to a protected component through a conductive wire. The second signal transmission end has at least one second side, wherein the second side corresponds to the first side and is spaced apart from the first side, wherein there is a gap between the second side and the first side, and the gap is positively related to a threshold voltage of the overvoltage protection structure.

An electronic apparatus with the overvoltage protection structure of the invention includes a core circuit, a plurality of conductive wires, and the overvoltage protection structure. The overvoltage protection structure is coupled to one of a plurality of conductive wires.

The electronic apparatus of the invention includes the core circuit, an electronic component, and at least one overvoltage protection structure. The overvoltage protection structure is coupled to the protected component.

Accordingly, the embodiments of the invention provide the overvoltage protection structure. The first signal transmission end and the second signal transmission end are separately disposed on the circuit board. By configuring the corresponding sides of the first signal transmission end and the second signal transmission end to have the gap, the overvoltage protection structure is activated when the designed voltage is greater than a threshold voltage, providing a path for electrical discharge. Therein, the overvoltage protection structure couples to the protected component through the conductive wire. Therefore, the overvoltage protection structure can be laid out at any appropriate position on the circuit board, achieving the effect of overvoltage protection and not increasing cost.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
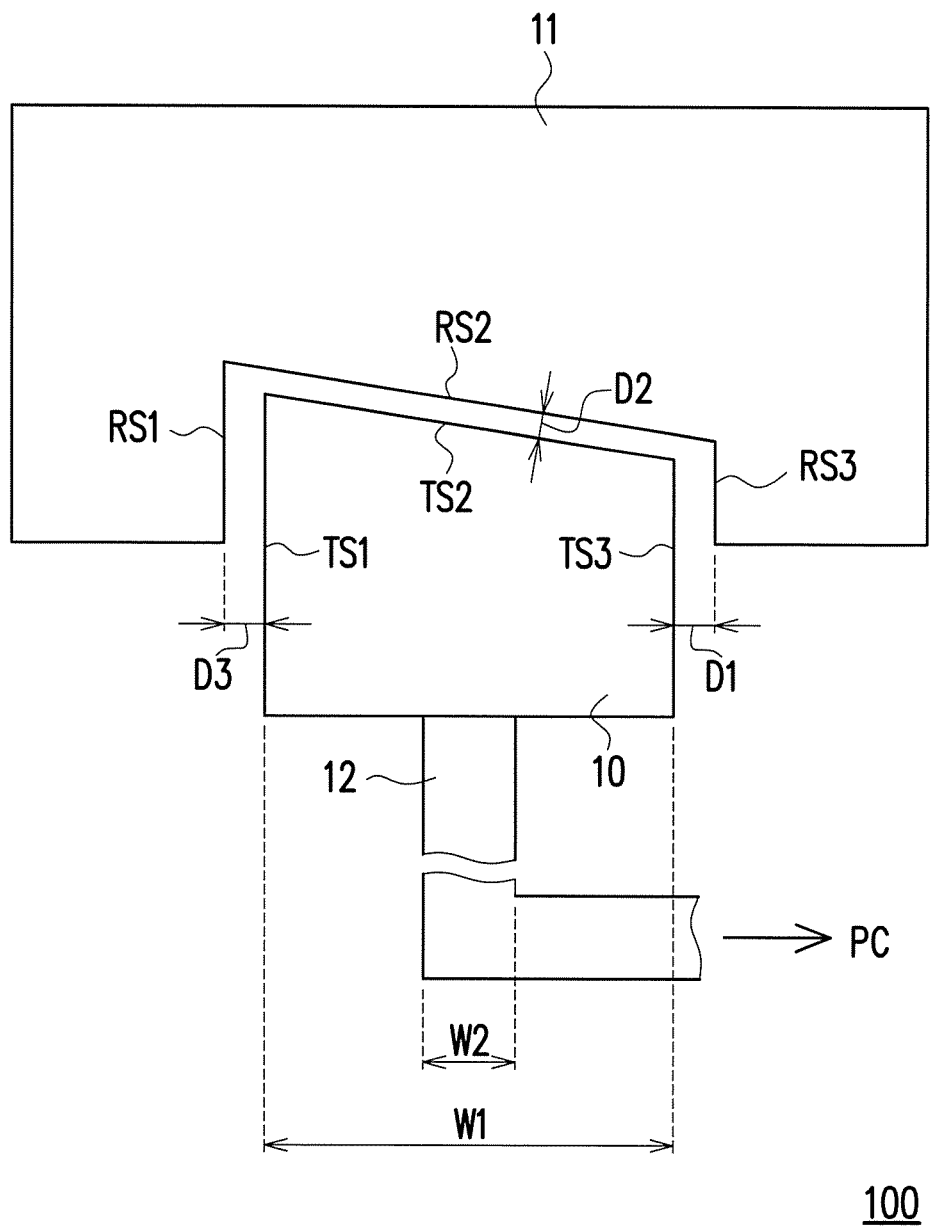
FIG. 1 illustrates a schematic diagram of an overvoltage protection structure of an embodiment of the invention.

Referring to FIG. 1, FIG. 1 illustrates a schematic diagram of an overvoltage protection structure in one embodiment of the invention. An overvoltage protection structure 100 includes a first signal transmission end 10 and a second signal transmission end 11. The first signal transmission end 10 has a plurality of sides TS1-TS3 and the second signal transmission end 11 has a plurality of sides RS1-RS3. The first signal transmission end 10 couples to a conductive wire 12, and couples to a protected component PC through the conductive wire 12. The second signal transmission end 11 couples to a reference ground end. In the overvoltage protection structure 100, the first signal transmission end 10 is regarded as a transmitting end, and the second signal transmission end 11 is regarded as a receiving end. The overvoltage protection structure 100 is disposed on a circuit board, wherein the circuit board can be a rigid printed circuit board or can be a flexible printed circuit board.

Furthermore, the plurality of sides TS1-TS3 of the first signal transmission end 10 respectively corresponds to the plurality of sides RS1-RS3 of the second signal transmission end 11, and the first signal transmission end 10 and the second signal transmission end 11 are not in contact with each other. In addition, there are gaps D1-D3 between the plurality of sides TS1-TS3 of the first signal transmission end 10 and the plurality of sides RS1-RS3 of the second signal transmission end 11, respectively, wherein the widths of the gaps D1-D3 are equal.

When an excessive voltage is applied to the first signal transmission end 10 that causes a voltage difference between the first signal transmission end 10 and the second signal transmission end 11 (a reference ground voltage is approximately equal to 0V) being greater than a threshold voltage, an electrical breakdown phenomenon occurs and the overvoltage protection structure 100 (between the first signal transmission end 10 and the second signal transmission end 11) would be conducted (or short circuited), as to activate an overvoltage protection. The overvoltage protection would discharge the electric charge of the first signal transmission end 10 to the reference ground end through the second signal transmission end 11. It is worth noted that the threshold voltage and the width of the gaps D1-D3 are positively correlated.

In contrast, in a normal state where the voltage difference between the first signal transmission end 10 and the second signal transmission end 11 would not be greater than the threshold voltage, the status of the first signal transmission end 10 and the second signal transmission end 11 would remain open circuit.

In the embodiment of the invention, the designer can adjust the width of the gaps D1-D3 according to the actual circuit requirements, and thereby adjust the threshold voltage of the overvoltage protection structure 100.

In another aspect, in the embodiment of the invention, the first signal transmission end 10 couples to the protected component PC through the conductive wire 12. When the protected component PC bears a relatively high voltage, a large amount of energy may be transmitted to the first signal transmission end 10 through the conductive wire 12, and discharged to the reference ground end through the overvoltage protection structure 100, such that the protected component PC is prevented from being burned and damaged due to the high voltage. It is worth noted that a width W2 of a signal transmission surface of the conductive wire 12 is less than a width W1 of a signal transmission surface of the first signal transmission end 10.

Furthermore, the overvoltage protection structure 100 couples to the protected component PC through the conductive wire 12, and therefore, the layout of the overvoltage protection structure 100 may be arranged at an appropriate position on the circuit board and connected to the protected component PC through the conductive wire 12 having a small surface area.

In another embodiment of the invention, the first signal transmission end 10 and the second signal transmission end 11 are respectively coated with a first conductive layer and a second conductive layer (not illustrated). The first conductive layer and the second conductive layer are respectively configured for increasing a thickness of the first signal transmission end 10 and the second signal transmission end 11. By controlling the thickness of the first conductive layer and the second conductive layer, the energy level of the electrical discharge can be adjusted. Therein, the thickness of the conductive layer and the energy level of the electrical discharge corresponding to the transmission end are positively correlated.

The first conductive layer and the second conductive layer may be formed by Tin (Sn), or other conductive materials.

In another aspect, a surface of the first signal transmission end 10 and the second signal transmission end 11 are not covered by a dielectric material. In other words, a solder mask (a dielectric layer) on the circuit board does not cover the surface of the first signal transmission end 10 and the second signal transmission end 11.

It is worth noted that the overvoltage protection structure 100 of the embodiment of the invention does not necessarily perform the discharge through a tip of the signal transmission ends, but through the corresponding sides of the first signal transmission end 10 and those of the second signal transmission end 11.

In addition, a total length of side(s) where the first signal transmission end 10 faces the second signal transmission end 11 (also referred to as corresponding side(s) between the first and second signal transmission ends 10, 11) is in proportion to the number of times for which the electrical discharge would be performed by the overvoltage protection structure 100, as well as maintaining the stability of each energy release of the electrical discharge action.

In other words, the areas of the corresponding sides between the first signal transmission end 10 and the second signal transmission end 11 is also in proportion to times of the electrical discharge action by the overvoltage protection structure 100.

In FIG. 1, since the electrical discharge occurs at the corresponding sides between the first signal transmission end 10 and those of the second signal transmission end 11, the electric charge does not concentrate at a particular region to perform discharge.

In addition, the overvoltage protection structure 100 of the embodiment of the invention performs the electrical discharge action through at least one of the plurality of corresponding sides, which maintains the threshold voltage of the overvoltage protection structure 100 to be substantially unchanged, even after electrical discharge actions occurs several times.

Figure 2:
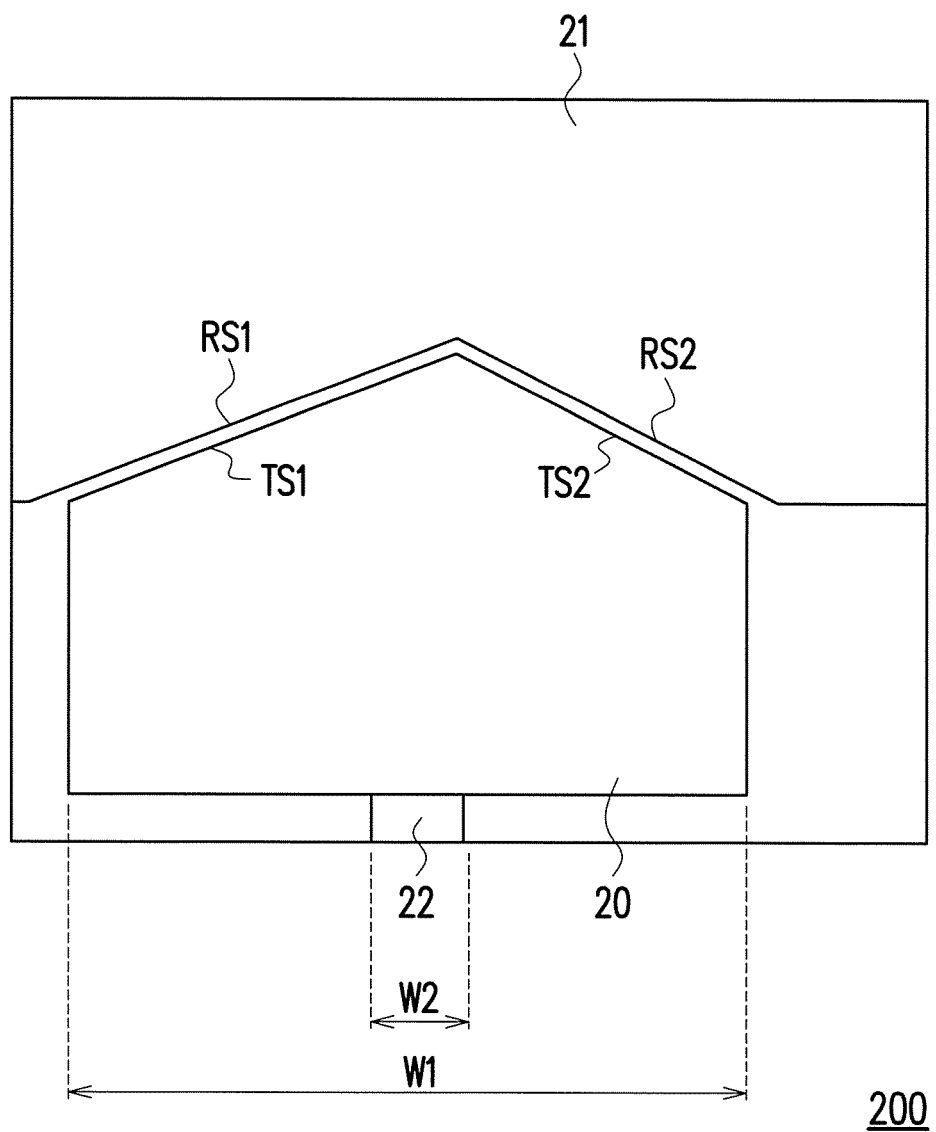
FIG. 2 illustrates a schematic diagram of the overvoltage protection structure according to another embodiment of the invention.

FIG. 2 illustrates a schematic diagram of the overvoltage protection structure according to another embodiment of the invention. An overvoltage protection structure 200 includes a first signal transmission end 20, a second signal transmission end 21, and a conductive wire 22. Different from the overvoltage protection structure 100 of FIG. 1, a shape of the first signal transmission end 20 and a shape of the second signal transmission end 21 of the overvoltage protection structure 200 are not the same as the shapes of the first signal transmission end 10 and the second signal transmission end 11 in the overvoltage protection structure 100. In addition, the first signal transmission end 20 is with two first sides TS1 and TS2. Therein, two second sides RS1 and RS2 on the second signal transmission end 21 respectively correspond to the two first sides TS1 and TS2 of the first signal transmission end 20. In other words, the first side TS1 faces the second side RS1 and the first side TS2 faces the second side RS2, which forms to corresponding sides. Same as the above embodiment, the width of the gap between the first side TS1 and the second side RS1, and the width of the gap between the first side TS2 and the second side RS2 are equal. In addition, the width of the gaps and the value of the threshold voltage supported by the overvoltage protection structure 200 are positively correlated.

The second signal transmission end 21 is coupled to the reference ground end and serves as the receiving end of electric charge. The first signal transmission end 20 is coupled to the conductive wire 22, where the first signal transmission end 20 is coupled to a protected component PC through the conductive wire 22. The first signal transmission end 20 serves as the transmitting end of electric charge. Therein, the width W1 of a signal transmission surface of the first signal transmission end 20 is greater than the width W2 of a signal transmission surface of the conductive wire 22.

Figure 3A:
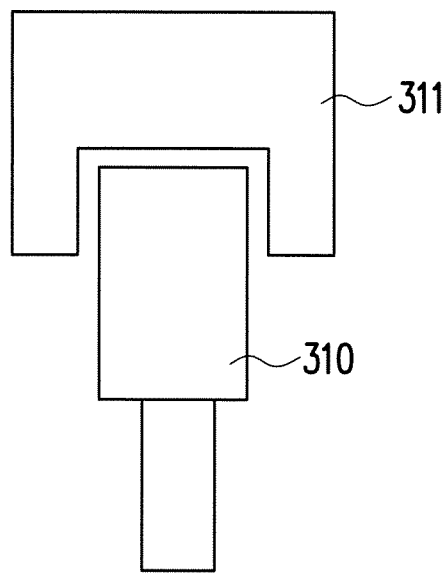
FIGS. 3A to 3D illustrate schematic diagrams of different implementations of the overvoltage protection structure of embodiments of the invention.

Referring to FIGS. 3A to 3D for the following, FIGS. 3A to 3D illustrate schematic diagrams of different implementations of the overvoltage protection structure according to some embodiments of the invention. Therein, the shapes of the signal transmission ends of the overvoltage protection structure, the numbers of the corresponding sides of the signal transmission ends and the shapes of the corresponding sides of the signal transmission ends are not limited. In FIG. 3A, the shape of a first signal transmission end 310 is a rectangle, and the shape of a second signal transmission end 311 is a rectangle having a concave, wherein there are three corresponding sides of the first signal transmission end 310 and the second signal transmission end 311, and each of the corresponding sides is a straight line.

Figure 3B:
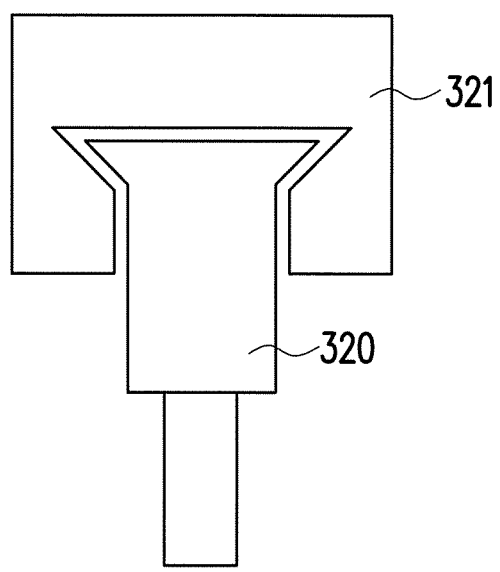

In FIG. 3B, a shape of a first signal transmission end 320 is a combination of a rectangle and a trapezoid. The shape of a second signal transmission end 321 is configured corresponding to the shape of the first signal transmission end 320. Therein, there are five corresponding sides of the first signal transmission end 320 and the second signal transmission end 321, and each of the corresponding sides is a straight line.

Figure 3C:
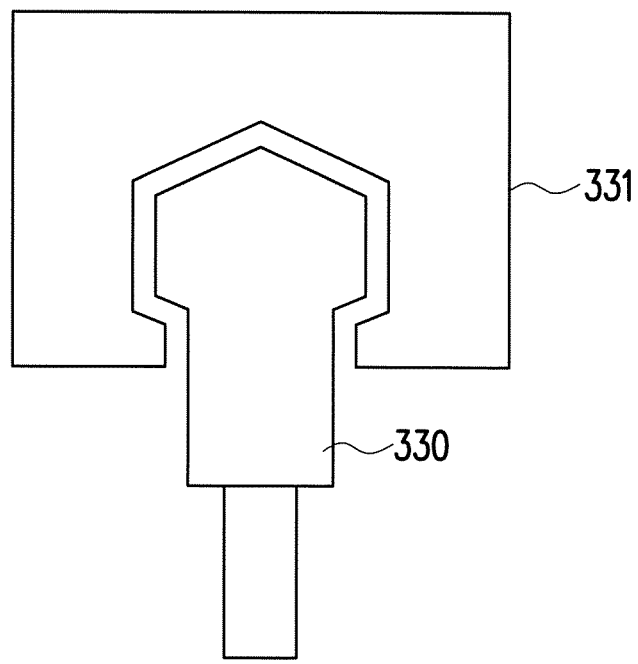

In FIG. 3C, a shape of a first signal transmission end 330 is a combination of a rectangle and a hexagon. The shape of a second signal transmission end 331 is configured corresponding to the shape of the first signal transmission end 330. Therein, there are eight corresponding sides of the first signal transmission end 330 and the second signal transmission end 331, and each of the corresponding sides is a straight line.

Figure 3D:
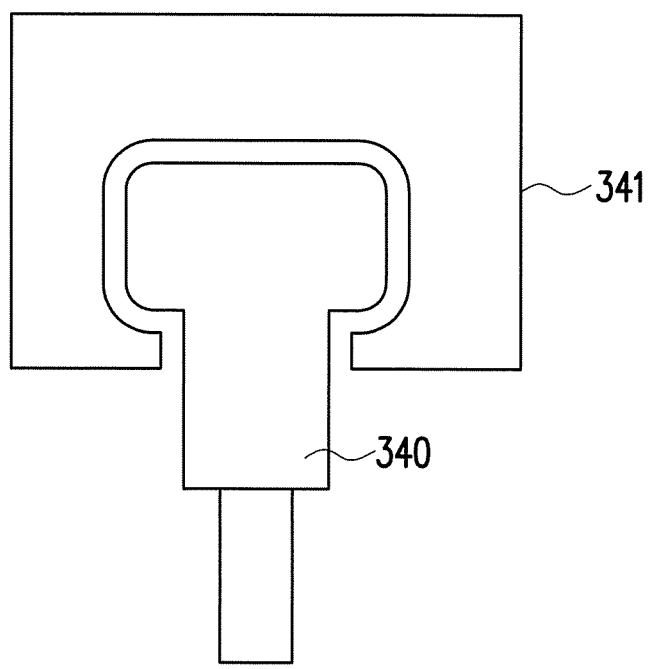

In FIG. 3D, a shape of a first signal transmission end 340 is a combination of a rectangle and a rectangle having round corners. A shape of a second signal transmission end 341 is configured corresponding to the shape of the first signal transmission end 340. Therein, each of the corresponding sides of the first signal transmission end 340 and the second signal transmission end 341 may be straight line or curved line.

Based on the description above, it is not difficult to find out that the shape of the first and the second signal transmission ends in the embodiments of the invention is not fixedly limited, and the shape of the corresponding sides thereof is not fixedly limited either. Therein, the shape of the corresponding sides of the first transmission end and that of the second signal transmission end can be a straight line, a curve, or any irregular shape, or a combination of the above.

Figure 4:
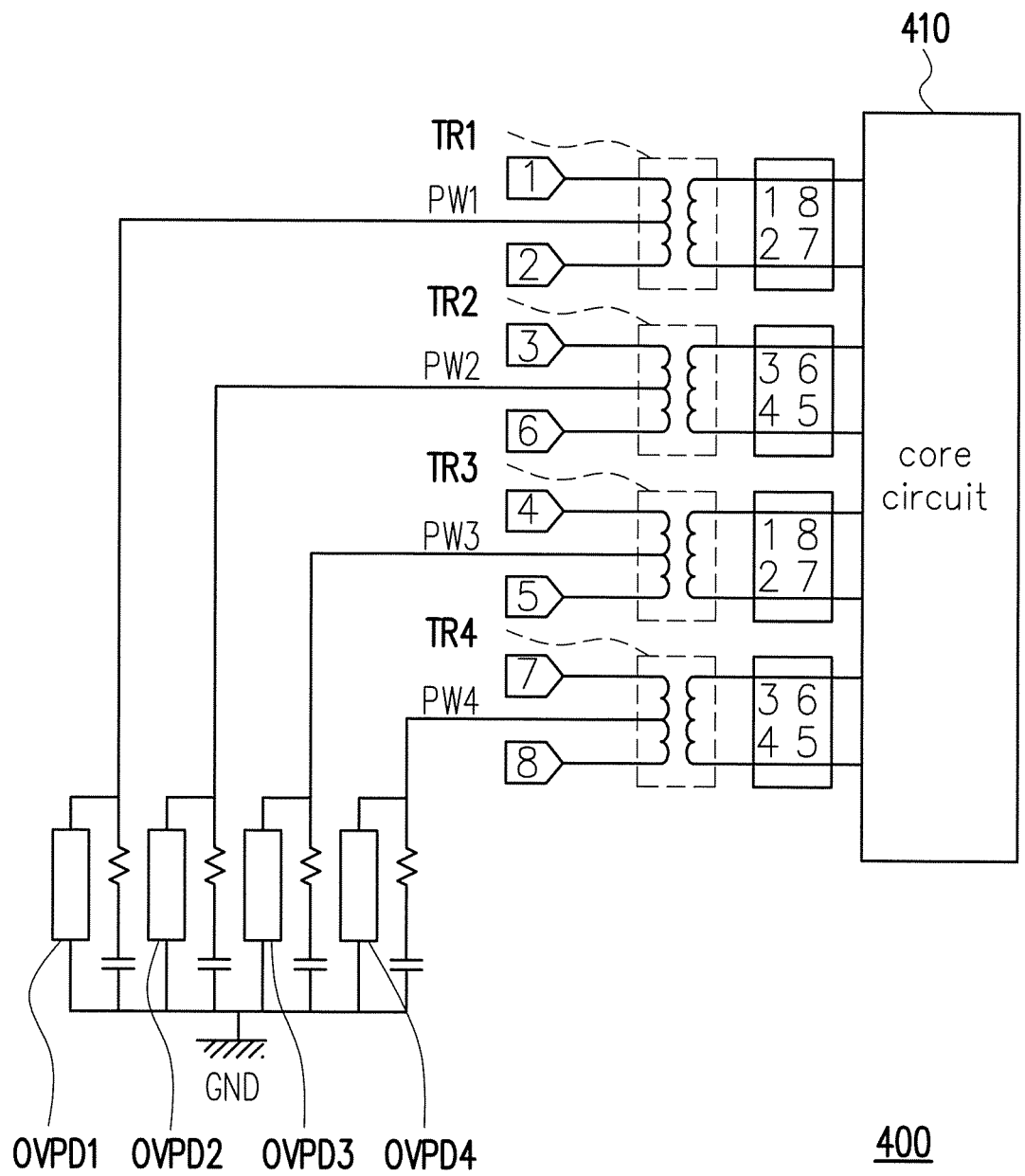
FIG. 4 illustrates a schematic diagram of an electronic apparatus of an embodiment of the invention.

Referring to FIG. 4, FIG. 4 illustrates a schematic diagram of an electronic apparatus of an embodiment of the invention. The electronic apparatus 400 includes a core circuit 410, transformers TR1-TR4, conductive wires PW1-PW4, and overvoltage protection structures OVPD1-OVPD4, wherein the conductive wires PW1-PW4 are respectively coupled to a side of the transformers TR1-TR4, and the core circuit 410 is coupled to the transformers TR1-TR4. The overvoltage protection structures OVPD1-OVPD4 are respectively coupled to a side of the conductive wires PW1-PW4 and coupled to a reference ground end GND, wherein a first signal transmission end of each of the overvoltage protection structures OVPD1-OVPD4 is coupled to each of the conductive wires PW1-PW4, and a second signal transmission end of each of the overvoltage protection structures OVPD1-OVPD4 is coupled to the reference ground end GND.

In the embodiment, the transformers TR1-TR4 are the protected components. Using TR1 as an example, when a high voltage is applied to the transformer TR1 (such as EOS or ESD phenomenon), the high voltage is transmitted to the first signal transmission end of the overvoltage protection structure OVPD1 through the conductive wire PW1. When the high voltage is greater than the threshold voltage of the overvoltage protection structure OVPD1, the overvoltage protection structure OVPD1 is activated, and the high voltage is released to the ground through the second signal transmission end of the overvoltage protection structure OVPD1. Thus, the transformer TR1 is prevented from a risk of being burned and damaged.

It is worth noting that in the embodiment, the transformer is only an example of the protected component for illustration. Any other active or passive components on the circuit board, or even a signal conductive wire, can all serve as the protected component.

In summary of the above, the overvoltage protection structure provided by the invention includes two signal transmission ends, where a gap is formed between the corresponding sides of the signal transmission ends. That the overvoltage protection structure is activated or forms an open circuit depending on the voltage difference between two signal transmission ends, and performs the electrical discharge action when activated. The circuit component will be prevented completely from being burned and damaged due to a high voltage applied on. Furthermore, the overvoltage protection structure of the invention couples to the protected component through the conductive wire, and thus the corresponding layout can be arranged at an appropriate position in the circuit board without increasing additional costs.

Although the invention has been described with reference to the above embodiments, it will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. An overvoltage protection structure comprising:
a first signal transmission end having at least one first side and coupled to a protected component through a conductive wire;
a second signal transmission end having at least one second side;
wherein the at least one second side corresponds to the at least one first side, and the at least one second side is spaced apart from the at least one first side,
wherein, there is at least one gap between the at least one second side and the at least one first side;
wherein at least one width of the at least one gap is positively related to a threshold voltage of the overvoltage protection structure, and
wherein a total length of the at least one first side is positively related to a number of occurrence of an electrical discharge action when the overvoltage protection structure is activated.

2. The overvoltage protection structure according to claim 1, wherein a number of the at least one first sides is the same as a number of the at least one second side, and the width of the at least one gap is equal.

3. The overvoltage protection structure according to claim 1, wherein when a voltage difference between the first signal transmission end and the second signal transmission end is greater than the threshold voltage, the overvoltage protection structure is activated, and when the voltage difference is not greater than the threshold voltage, then the overvoltage protection structure is open.

4. The overvoltage protection structure according to claim 1, wherein the first signal transmission end and the second signal transmission end are respectively coated with a first conductive layer and a second conductive layer, wherein a thickness of the first conductive layer and a thickness of the second conductive layer is positively related to an energy level of electrical discharge by the first signal transmission end and the second signal transmission end when the overvoltage protection structure is activated.

5. The overvoltage protection structure according to claim 1, wherein the first signal transmission end and the second signal transmission end are disposed on a circuit board, and the first signal transmission end and the second signal transmission end do not overlap with a dielectric layer on the circuit board.

6. The overvoltage protection structure according to claim 1, wherein a width of a signal transmission face of the first signal transmission end is greater than a width of a signal transmission face of the conductive wire.

7. The overvoltage protection structure according to claim 1, wherein the circuit board comprises a flexible circuit board or a rigid circuit board.

8. The overvoltage protection structure according to claim 1, wherein a shape of the at least one first side is a curve, a straight line, or an irregular shape.

9. An electronic apparatus comprising:
a core circuit;
a plurality of electronic components; and
at least one overvoltage protection structure according to claim 1, coupled to the protected component of at least one of the plurality of electronic components.

* * * * *